(12) United States Patent
Ishibashi et al.

(10) Patent No.: US 9,976,658 B2
(45) Date of Patent: May 22, 2018

(54) DIAPHRAGM VALVE

(71) Applicant: FUJIKIN INCORPORATED, Osaka-shi (JP)

(72) Inventors: Keisuke Ishibashi, Osaka (JP); Taichi Kitano, Osaka (JP); Tsuyoshi Tanikawa, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days. days.

(21) Appl. No.: 14/898,584

(22) PCT Filed: Jul. 4, 2014

(86) PCT No.: PCT/JP2014/067870
§ 371 (c)(1),
(2) Date: Dec. 15, 2015

(87) PCT Pub. No.: WO2015/008633
PCT Pub. Date: Jan. 22, 2015

(65) Prior Publication Data
US 2016/0131269 A1 May 12, 2016

(30) Foreign Application Priority Data

Jul. 18, 2013 (JP) ................................ 2013-149254

(51) Int. Cl.
*F16K 7/17* (2006.01)
(52) U.S. Cl.
CPC ..................................... *F16K 7/17* (2013.01)

(58) Field of Classification Search
CPC ..... F16K 7/17; F16K 7/20; F16K 7/12; F16K 7/14; F16K 7/16
(Continued)

(56) References Cited

U.S. PATENT DOCUMENTS 5,820,105 A 10/1998 Yamaji et al.
6,092,550 A * 7/2000 Gotch ....................... F16K 7/16
137/331

(Continued)

FOREIGN PATENT DOCUMENTS

JP 63-9570 U 1/1988
JP 4-48470 U 4/1992

(Continued)

OTHER PUBLICATIONS

International Search Report dated Sep. 2, 2014, issued for PCT/JP2014/067870.

(Continued)

*Primary Examiner* — Marina Tietjen
(74) *Attorney, Agent, or Firm* — Locke Lord LLP

(57) ABSTRACT

Provided is a diaphragm valve whose durability is improved by proper caulking. On a bottom surface 2d of a depression 2c of a body 2, an annular inner projection 22 having a relatively small diameter and an annular outer projection 23 having a relatively large diameter are provided. A seat 5 is made of synthetic resin and is inserted between the inner projection 22 and the outer projection 23. Both projections 22, 23 are caulked, whereby the seat 5 is prevented from coming off. The height of the inner projection 22 is less than that of the outer projection 23, and a corner 22a on the outside of the inner projection 22 has a curved surface.

1 Claim, 2 Drawing Sheets

(58) Field of Classification Search
USPC .......................................... 251/331, 362–363
See application file for complete search history.

(56) References Cited

U.S. PATENT DOCUMENTS

| | | | | |
|---|---|---|---|---|
| 6,189,861 | B1* | 2/2001 | Gotch | F16K 7/16 251/331 |
| 8,172,197 | B2* | 5/2012 | Gu | F16K 7/17 137/625.27 |
| 2006/0118752 | A1* | 6/2006 | Tin-Kai | F16K 7/16 251/331 |
| 2007/0045587 | A1* | 3/2007 | Kolenc | F16K 1/465 251/331 |
| 2011/0308655 | A1* | 12/2011 | Keeper | F16K 7/16 138/89 |
| 2012/0097881 | A1* | 4/2012 | Aoyama | F16K 1/425 251/359 |

FOREIGN PATENT DOCUMENTS

| | | |
|---|---|---|
| JP | 09-014471 A | 1/1997 |
| JP | 2002-513457 A | 5/2002 |
| JP | 2008-304067 A | 12/2008 |
| JP | 2012-92861 A | 5/2012 |
| WO | WO-98/34056 A2 | 8/1998 |

OTHER PUBLICATIONS

Notification of Reason for Refusal dated Mar. 22, 2017, issued for the Korean patent application No. 10-2015-7035669 and English translation thereof.

\* cited by examiner

DIAPHRAGM VALVE

TECHNICAL FIELD

The present invention relates to a diaphragm valve.

BACKGROUND ART

A diaphragm valve using a diaphragm as a valve body has been conventionally well known. The conventional diaphragm valve is shown in FIG. 3 and FIG. 4.

In FIG. 3, a diaphragm valve 1 includes a block-like body 2 having a fluid inflow channel 2a, a fluid outflow channel 2b, and a depression 2c opening upward, a cylindrical hood 3 having a lower end portion screwed into an upper portion of the depression 2c of the body 2 and extending upward, a casing 4 screwed into the hood 3, an annular seat 5 made of synthetic resin and disposed on a circumferential edge of the fluid inflow channel 2a, a diaphragm 6 that is pressed against or separated from the seat 5 to open and close the fluid inflow channel 2a, a diaphragm presser 7 that presses a central portion of the diaphragm 6, and an actuator (not shown) that is built in the hood 3 and the casing 4 and causes the diaphragm 6 to press against and separate from the seat 5 via the diaphragm presser 7.

As shown in FIG. 4 in an enlarged scale, on a bottom surface 2d of the depression 2c of the body 2, an annular inner projection 12 having a relatively small diameter and an annular outer projection 13 having a relatively large diameter are provided, and the seat 5 made of synthetic resin are inserted between the inner projection 12 and the outer projection 13. The inner projection 12 is caulked radially outward and the outer projection 13 is caulked radially inward, whereby the seat 5 made of synthetic resin is prevented from coming off.

Patent Literature 1 discloses that the inner projection is caulked whereby the seat is prevented from coming off.

CITATION LIST

Patent Literature

Patent Literature 1: Japanese Unexamined Patent Application Publication (Translation of PCT Application) No. 2002-513457.

SUMMARY OF THE INVENTION

Technical Problem

In the conventional diaphragm valve described above, proper caulking is effective for improving durability of the seat, but there has been a problem that sufficient durability cannot be obtained with the diaphragm valve disclosed in Patent Literature 1.

An object of the present invention is to provide a diaphragm valve whose durability is improved by proper caulking.

Solution to Problem

The diaphragm valve in accordance with the present invention is a diaphragm valve including a body provided with a fluid inflow channel, a fluid outflow channel, and a depression opening upward, an annular seat disposed on a bottom surface of the depression of the body, and an elastically deformable diaphragm that is pressed against and separated from the seat to open and close the fluid channel, an annular inner projection having a relatively small diameter and an annular outer projection having a relatively large diameter being provided on the bottom surface of the depression of the body, the seat being made of synthetic resin and being inserted between the inner projection and the outer projection, and both projections being caulked whereby the seat is prevented from coming off, the diaphragm valve being characterized in that the height of the inner projection is less than that of the outer projection and that a corner on the outside of the inner projection has a curved surface.

The seat is, for example, made of polychlorotrifluoroethylene (PCTFE), but may be made of other synthetic resin. The material of the body is, for example, made of steel such as 316L, but not particularly limited thereto.

Caulking (plastic deformation) of each projection is performed with an appropriate caulking jig. The caulking jig for the inner projection preferably has a shape different from that of the conventional caulking jig since the height of the inner projection is less than that of the outer projection (conventional inner projection).

The configuration of the diaphragm valve other than the seat, the inner projection, and the outer projection is an appropriate known configuration. For example, an actuator that causes the diaphragm to press against and separate from the seat may be one that uses compressed air, and may be of other configuration. The diaphragm is, for example, made of a nickel alloy sheet, but may be made of a stainless steel sheet or may be made of a laminated body composed of a stainless steel sheet and a nickel-cobalt alloy sheet.

The height of the outer projection is less than that of the seat so as not to interfere with the diaphragm. The height of the inner projection is typically equal to that of the outer projection, but in the diaphragm valve of the present invention, the height of the inner projection is less than that of the outer projection. It is preferable that (the height of the outer projection—the height of the inner projection) be 0.5 mm or more.

By the configuration that the height of the inner projection is less than that of the outer projection and that the corner on the outside of the inner projection has a curved surface, stress concentration on the seat by the corner on the outside of the inner projection is alleviated, which allows for the proper caulking, resulting in achieving significant improvement of durability of the seat made of synthetic resin.

The preferable condition for improving the durability is 0.4 mm≤the height of the inner projection ≤1.0 mm. The more preferable condition for improving the durability is 0.5 mm≤the height of the inner projection ≤0.7 mm. In the conventional diaphragm valve, the height of the inner projection is about 1.5 mm. Simulation of the amount of deformation of the seat using the conventional height of the inner projection of diaphragm valve described above as a reference reveals that, with the inner projection having a height of 1 mm, the amount of strain is decreased by about 31%. In addition, with the inner projection having a height of 0.4 mm, the amount of strain is decreased by about 63%. In order to decrease the amount of strain by 50% or more, it is preferable that the height of the inner projection be 0.7 mm or less. If the height of the inner projection is too lowered, there is a possibility that the seat might come off. When the height of the inner projection is 0.4 mm or more, more preferably 0.5 mm or more, the seat is reliably prevented from coming off.

Advantageous Effects of Invention

In the diaphragm valve in accordance with the present invention, the height of the inner projection is less than that of the outer projection, and the corner on the outside of the inner projection has a curved surface. This configuration enables alleviating the stress concentration on the seat by the corner of the inner projection and enables proper caulking, whereby significant improvement of the durability of the seat made of synthetic resin is achieved.

REFERENCE SIGNS LIST

Figure 1:
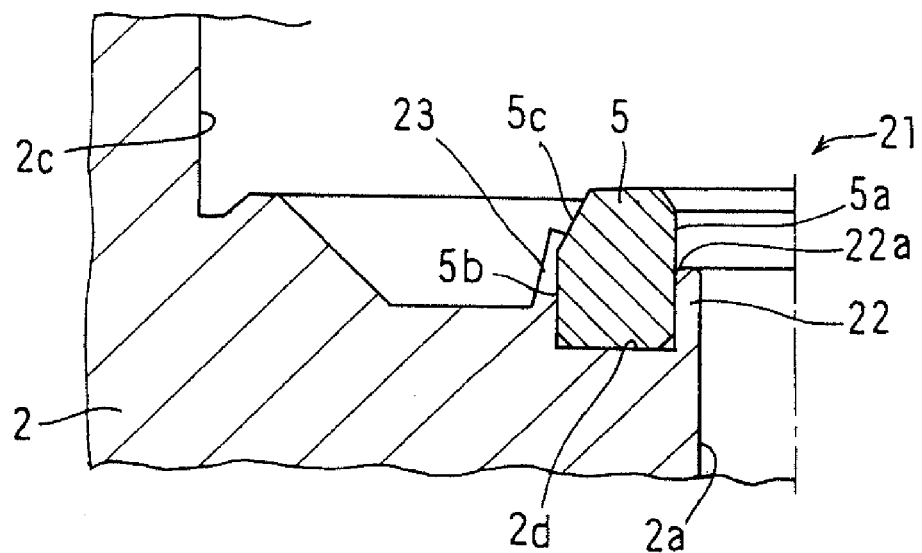
FIG. 1 is an enlarged longitudinal sectional view showing a first embodiment of a diaphragm valve in accordance with the present invention.

2: body, 2a: fluid inflow channel, 2b: fluid outflow channel, 2c: depression, 2d: bottom surface, 5: seat, 6: diaphragm, 21, 31: diaphragm valve, 22, 32: inner projection, 22a, 32a: corner on the outside, 23, 33: outer projection

DESCRIPTION OF EMBODIMENTS

Embodiments of the present invention will be described with reference to the drawings. In the following description, the overall view of the diaphragm valve is the same as that in FIG. 3 except for the holding section of the seat, and is therefore not shown in the drawings. Only the holding section of the seat, corresponding to the holding section of the seat shown in FIG. 4, will be shown and illustrated.

FIG. 1 shows the main part of the first embodiment of the diaphragm valve in accordance with the present invention. In a diaphragm valve 21, an annular inner projection 22 having a relatively small diameter and an annular outer projection 23 having a relatively large diameter are provided on a bottom surface 2d of a depression 2c of a body 2. A seat 5 is made of synthetic resin and is inserted between the inner projection 22 and the outer projection 23. Both of the projections 22, 23 are caulked, whereby the seat 5 is prevented from coming off.

The seat 5 is made of polychlorotrifluoroethylene (PCTFE). The material of the body 2 is a stainless steel (for example, made of steel such as 316L).

The seat 5 is the same as the conventional one and has an annular body whose cross section is substantially rectangle. More specifically, an inner circumferential surface 5a thereof has a cylindrical surface, and an outer circumferential surface thereof has a cylindrical surface 5b on the lower side and a tapered surface 5c on the upper side.

Figure 3:
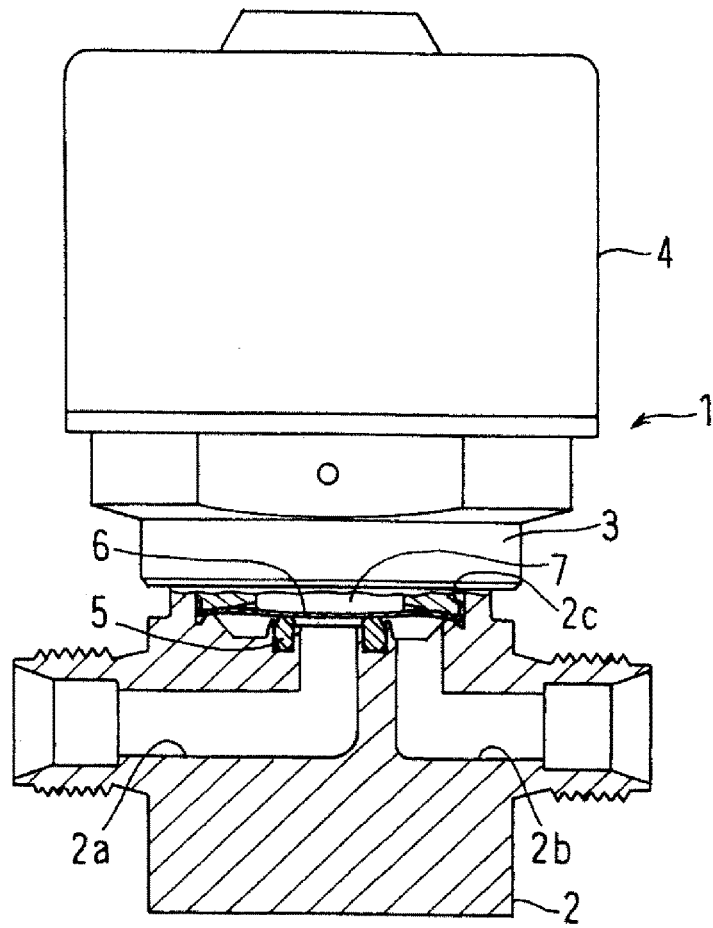
FIG. 3 is a longitudinal sectional view showing a conventional diaphragm valve.

The height of the inner projection 22 and the height of the outer projection 23 are both less than that of the seat 5 so as not to interfere with the diaphragm (see 6 in FIG. 3). The height of the inner projection 22 is typically equal to that of the outer projection 23, but in the diaphragm valve 21 of this embodiment the height of the inner projection 22 is less than that of the outer projection 23. The height (the upper end position) of the outer projection 23 is above the boundary between the cylindrical surface 5b and the tapered surface 5c on the outer circumferential surface of the seat 5. A corner 22a on the outside of the inner projection 22 has a curved surface.

In this embodiment, the specific dimension is such that the upper end position of the inner projection 22 is located 1.0 mm from the bottom surface 2d of the depression 2c, and the distance between the upper end position of the inner projection 22 and the upper end position of the seat 5 is 1.0 mm.

Figure 4:
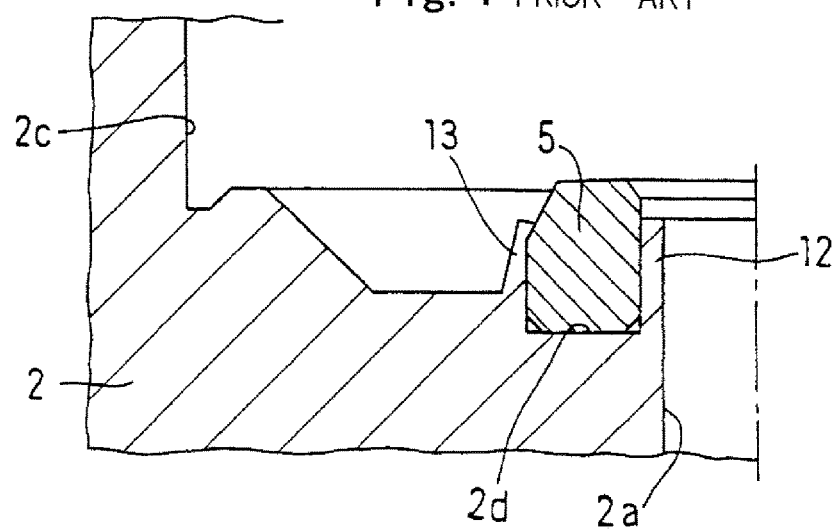
FIG. 4 is an enlarged longitudinal sectional view showing a main part of FIG. 3.

In conventional one shown in FIG. 4, the specific dimension is such that the upper end position of the inner projection 12 is located 1.5 mm from the bottom surface 2d of the depression 2c, and the distance between the upper end position of the inner projection 12 and the upper end position of the seat 5 is 0.5 mm.

Figure 2:
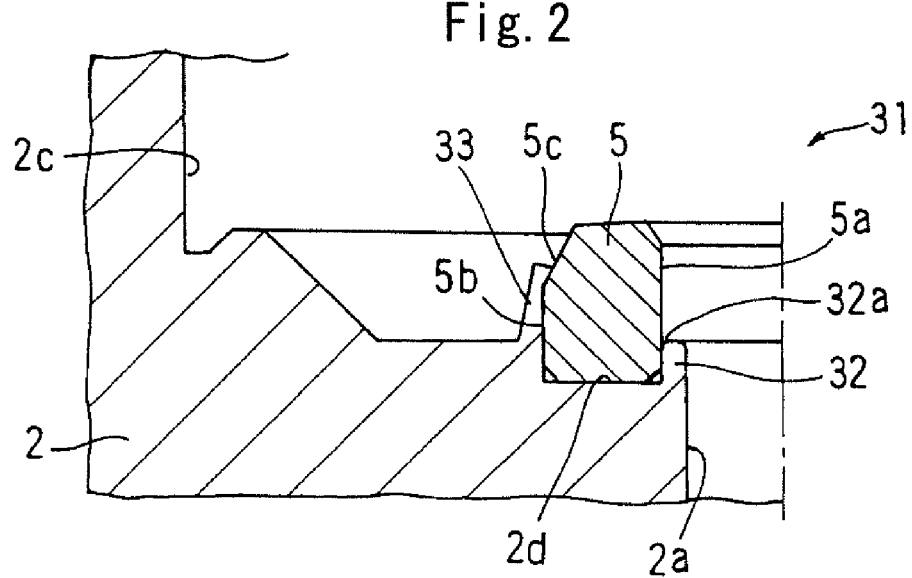
FIG. 2 is an enlarged longitudinal sectional view showing a second embodiment of the diaphragm valve in accordance with the present invention.

FIG. 2 shows a main part of a second embodiment of the diaphragm valve in accordance with the present invention. In a diaphragm valve 31, on the bottom surface 2d of the depression 2c of the body 2, an annular inner projection 32 having a relatively small diameter and an annular outer projection 33 having a relatively large diameter are provided, the seat 5 is made of synthetic resin and is inserted between the inner projection 32 and the outer projection 33, and both of the projections 32, 33 are caulked whereby the seat 5 is prevented from coming off.

In the diaphragm valve 31 of the second embodiment, as compared to the diaphragm valve 21 of the first embodiment, the upper end position of the inner projection 32 is further lowered. The outer projection 33 is the same as the one of the diaphragm valve 21 of the first embodiment. The corner 32a on the outside of the inner projection 32 has a curved surface.

The specific dimension in this embodiment is such that the upper end position of the inner projection 32 is located 0.5 mm from the bottom surface 2d of the depression 2c, and the distance between the upper end position of the inner projection 32 and the upper end position of the seat 5 is 1.5 mm.

Table 1 shows results of simulation in which the amount of deformation (equivalent strain) of the seat 5 is obtained for each of the cases where the upper end position of the inner projection 12, 22, 32 is altered. The upper end position of the inner projection 12, 22, 32 is a distance from the bottom surface 2d of the depression 2c of the body 2.

TABLE 1

| Upper end position of the inner projection | Equivalent stress $\varepsilon$ |
|---|---|
| 1.5 (Conventional) | 0.613 |
| 1.0 | 0.421 |
| 0.4 | 0.229 |

According to Table 1, as compared to the conventional shape (the height of the inner projection 12 is 1.5 mm), with the inner projection 22 having a height of 1.0 mm as in the first embodiment, the equivalent stress is 0.421/0.613=0.69, resulting in decrease by 31%, whereas with an inner caulked portion having a height of 0.4 mm (which is 0.1 mm lower than the height of the inner projection 32 in the second embodiment), the equivalent stress is 0.229/0.613=0.37, resulting in decrease by 63%.

That is, since the height of the inner projection 22, 32 is less than that of the outer projection 23, 33, proper caulking is possible, whereby durability of the seat 5 made of synthetic resin is significantly improved.

Furthermore, since the corner 22a, 32a on the outside of the inner projection 22, 32 has a curved surface, caulking that is more advantageous to the durability is possible, whereby durability of the seat 5 made of synthetic resin is further improved. As for the shape of the curved surface, various shapes are possible, which include from a curved surface in which the degree of chamfering is small, to a curved surface in which the distal end of the inner projection is semicircular.

The preferable condition for improving durability is, in view of reliably preventing the seat 5 from coming off, 0.4 mm the height of the inner projection 22, 32 (the distance from the bottom surface 2*d* of the depression 2*c*)≤1.0 mm. The more preferable condition for improving durability is 0.5 mm≤the height of the inner projection 22, 32≤0.7 mm.

This condition is applicable even in the case where the seat 5 is made of synthetic resin other than polychlorotrifluoroethylene (PCTFE), and even in the case where the material of the body 2 is steel other than 316 L.

INDUSTRIAL APPLICABILITY

In diaphragm valves, improvement of durability of diaphragms is a problem to be solved. The present invention enables improving durability of the diaphragm without changing the diaphragm itself, and therefore contributes to improvement of the performance of the diaphragm valve.

The invention claimed is:

1. A diaphragm valve comprising:
a body including a fluid inflow channel, a fluid outflow channel, and a depression opening upward;
an annular seat disposed on a bottom surface of the depression of the body; and
an elastically deformable diaphragm that is pressed against and separated from the seat to open and close the fluid channel,
on the bottom surface of the depression of the body, an annular inner projection having a relatively small diameter and an annular outer projection having a relatively large diameter being provided,
the seat being made of synthetic resin and being inserted between the inner projection and the outer projection, and
both of the projections being caulked whereby the seat is prevented from coming off,
wherein an inner circumferential surface of the seat has a cylindrical surface and an outer circumferential surface of the seat has a cylindrical surface on a lower side and a tapered surface on an upper side, and an upper end portion of the outer projection is above a boundary between the cylindrical surface and the tapered surface on the outer circumferential surface of the seat,
the diaphragm valve characterized in that a height of the inner projection is less than that of the outer projection and that a corner on an outside of the inner projection has a curved surface,
and 0.4 mm ≤ the height of the inner projection ≤1.0 mm, wherein
an equivalent stress on the seat is decreased by at least about 30% as compared to the equivalent stress on the seat with the inner projection having a height of 1.5 mm.

* * * * *